United States Patent [19]

Liu

[11] 4,454,287

[45] Jun. 12, 1984

[54] GLASS REINFORCED POLYOLEFIN COMPOSITES MODIFIED WITH AROMATIC POLYCARBONATES

[75] Inventor: Ping Y. Liu, Naperville, Ill.

[73] Assignee: General Electric Company, Mt. Vernon, Ind.

[21] Appl. No.: 452,058

[22] Filed: Dec. 22, 1982

[51] Int. Cl.$^3$ .............................................. C08L 69/00
[52] U.S. Cl. ...................................... 524/508; 525/146
[58] Field of Search ................ 525/146; 524/508, 494; 523/206

[56] References Cited

U.S. PATENT DOCUMENTS

| | | | |
|---|---|---|---|
| 2,999,835 | 9/1961 | Goldberg | 260/42 |
| 3,028,365 | 4/1962 | Schnell et al. | 260/47 |
| 3,153,008 | 10/1964 | Fox | 260/47 |
| 3,334,154 | 8/1967 | Kim | 260/860 |
| 3,431,224 | 3/1969 | Goldblum | 525/146 |
| 3,639,331 | 2/1972 | Hattori et al. | 260/31.8 |
| 3,654,219 | 4/1972 | Boyer et al. | 524/508 |
| 4,001,184 | 1/1977 | Scott | 260/47 XA |
| 4,076,698 | 2/1978 | Anderson et al. | 526/348.6 |
| 4,123,436 | 10/1978 | Holub et al. | 260/30.8 R |
| 4,131,575 | 12/1978 | Adelmann et al. | 260/17.4 R |

FOREIGN PATENT DOCUMENTS

| | | | |
|---|---|---|---|
| 4645 | 10/1979 | European Pat. Off. | |
| 1495674 | 4/1969 | Fed. Rep. of Germany | 525/146 |
| 13663 | 1/1965 | Japan | 525/146 |
| 8085641 | 11/1973 | Japan | 524/508 |

OTHER PUBLICATIONS

Heinert, D., "Polycarbonate Blends with Improved Critical Thickness", Dow Research Disclosure No. 20810, Aug. 1981.

*Primary Examiner*—Theodore Pertilla
*Attorney, Agent, or Firm*—Martin B. Barancik

[57] ABSTRACT

Compositions of a thermoplastic polyolefin resin reinforced with glass fibers and including a minor amount of a high molecular weight aromatic polycarbonate resin as a impact modifier.

6 Claims, No Drawings

GLASS REINFORCED POLYOLEFIN COMPOSITES MODIFIED WITH AROMATIC POLYCARBONATES

BACKGROUND OF THE INVENTION

This invention relates generally to novel glass reinforced thermoplastic polyolefin compositions, including a high molecular weight aromatic polycarbonate resin to improve ductility in the final article. The compositions are particularly adapted for injection, extrusion and transfer molding. Further, the compositions produce, when molded or extruded, articles which have excellent physical properties.

It is known from the prior art, e.g., Hattori et al, U.S. Pat. No. 3,639,331, that it is difficult to provide uniform dispersions of fiber glass filaments, glass threads, or roving, in compounded form with suitable molding plastics such as polystyrene, acrylic resins, polyvinyl chloride resins, polysulfone resins, polyester resins, polyolefin resins, polycarbonate resins and the like.

In the said '331 patent, it is proposed to overcome these problems by adding a small amount of dispersion aid which can be, for example, a high viscosity hydrocarbon lubricant, a plasticizer or a low molecular weight resin. It is also known that polyolefins, such as polyethylene and polypropylene can be filled with glass to provide reinforced composites, but these generally have rather poor impact properties and an undesirable brittle mode of failure. In Example 4 of the '331 patent, the dispersion of a crystalline polypropylene-20 percent glass composite is reportedly improved by adding a small amount of a low molecular weight polypropylene—but there is no disclosure of any effect on the impact strength of the resulting composite.

It has now been discovered that composites of polyolefins and glass can be significantly improved in terms of a more desirable ductile mode of failure and better weld line and knit line strength if a high molecular weight aromatic polycarbonate resin is added in minor proportions as a modifier. The results obtained are surprising in light of the prior art, especially the '331 patent, which states that the low molecular weight resin can comprise generally any thermoplastic resin, such as polyethylene, polypropylene, nylon and others, so long as the melt flow (ASTM-D-1238) is from about 50 to 250 grams per 10 minutes or even higher, e.g., up to 5,000 grams per 10 minutes. The high molecular weight aromatic polycarbonates used herein have a much lower melt flow, e.g., in the range of 2.8 to about 20 grams per 10 minutes.

DETAILED DESCRIPTION OF THE INVENTION

According to the present invention, there are provided glass reinforced thermoplastic resin compositions comprising
(a) a thermoplastic polyolefin resin having incorporated therein from about 5 to about 60 parts by weight of glass fibers per 100 parts by weight total of said resin and said glass; and
(b) a minor amount of a high molecular weight aromatic polycarbonate resin impact modifier.

The thermoplastic polyolefin resin composite with glass fibers used as component (a) can be made in known ways from commercially available materials, or a preformed composite can also be selected from commercial sources. The thermoplastic polyolfein resin can vary widely in type without departing from the invention. Illustratively, ethylene homopolymers of high and low density can be used, as can poly alpha-olefins of from 3 to 12 or more carbon atoms, preferably 3 to 8 carbon atoms, e.g., polypropylene (crystalline or amorphous), poly(butene-1), poly(isobutylene), poly(hexene-1), poly(octene-1) and the like. Also useful are copolymers of ethylene with one or more of such alpha-olefins, such as ethylene-propylene copolymers, ethylene-hexene-1 copolymers, ethylene-octene-1 copolymers and the like. The term polyolefin also includes copolymers with acrylic acid and acrylic esters, e.g., of from about 3 to 8 carbon atoms, e.g., ethyl acrylate, n-hexyl acrylate and the like, or with methacrylic acid or methacrylic esters, e.g., of from about 4 to about 9 carbon atoms, e.g., methyl methacryate, n-hexyl methacrylate and the like. Preferred polyolefin resins are polyethylene resin and polypropylene resin. Special mention is made of a family of resins known as linear low density polyolefin resins, especially linear low density polyethylene resins.

The linear low density polyethylene (LLDPE) may be prepared from state of the art polymerization processes such as those described in U.S. Pat. No. b 4,076,698 and Eur. Pat. Appl. No. 4,645, both of which are incorporated by reference. This polymer may have a density between about 0.89 and about 0.96 gms/cc and a controlled concentration of simple side chain branching—as opposed to random branching—which distinguishes it from polymers such as high pressure low density polyethylene and high density polyethylene. The preferred range of density is from 0.915 to 0.945 gms/cc. The LLDPE polymer used in the practice of the invention is made from ethylene and butene-1 or other alpha olefin of $C_4$–$C_8$ carbon content or mixtures thereof. The comonomer is used in a minor amount, i.e., 10 mol% or less of the total amount of monomers. A preferred range is about 1–3 mol%.

The preferred copolymers have a melt flow ratio of $\geq 22$ to $\leq 32$ and preferably $\geq 25$ to $\leq 30$, under temperature conditions specified below. The melt flow ratio of the copolymer is another means of indicating its molecular weight distribution. The melt flow ratio (MFR) range of $\geq 22$ to $\leq 32$ corresponds to a Mw/Mn value of about 2.7 to 4.1 and the MFR range of $\geq 25$ to $\leq 30$ corresponds to a Mw/Mn range of 2.8 to 3.6.

The MFR is determined by dividing the High Load Melt Index (HLMI) by the Melt Index (MI) measured at lower load. The MI is determined according to ASTM D-1238, Condition E, measured at 190° C. and reported as grams per 10 minute. The HLMI is determined by ASTM D-1238, Condition F, measured at 10 times the load used in the melt index test.

The LLDPE copolymer has a preferred density of between about 0.915 and 0.945. The density of the copolymer is primarily regulated by the amount of the comonomer which is copolymerized with the ethylene. The addition of increasing amounts of the comonomer to the copolymer results in a lowering of the density of the copolymer.

The preferred copolymer is a copolymer made from ethylene and butene-1 such as Escorene LPX-15 (Exxon, Houston, Tex., USA). Typically, it has an unsaturated group content of $\leq 1$ and preferably $\geq 0.1$ to $\leq 0.3$, C=C/1000 carbon atoms and less than about 3 and preferably less than 2 weight percent content (at 50° C.) of n-hexane extractables. The preferred material is made by the Unipol process which is described in Chem. Eng., Dec. 3, 1979, pp. 80-85 which is incorporated by reference.

Although it is only necessary to have at least a reinforcing amount of the fibrous glass reinforcement present, in general, for ease of processing, the reinforcing filler will comprise from about 5 to about 60 parts by weight, preferably from about 10 to about 30 parts per 100 parts by weight total of said resin and said glass. In particular, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The filament diameters range from about 0.003 to 0.009 inch, but this is not critical to the present invention.

By glass fibers it is understood that glass silk, as well as all glass fiber materials derived therefrom including glass fiber fabrics, rovings, staple fibers and glass fiber mats are included. The length of the glass filaments and whether or not they are bundled into fibers and the fibers bundled in turn to yarns, ropes or rovings, or woven into mats, and the like, is also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛" to about 1" long, preferably less than ¼" in length. These are called chopped strands. Some of these binding agents are polymers such as polyvinyl acetate, particular polyester resins, polycarbonates, starch, acrylic, melamine or polyvinyl alcohol.

The aromatic polycarbonate resin used as impact modifier (b) may be of the formula:

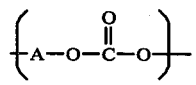

wherein A is a divalent aromatic radical. Preferred aromatic polycarbonate resins are of the formula:

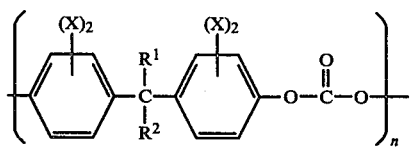

wherein $R^1$ and $R^2$ are hydrogen, (lower) alkyl or phenyl, X is selected from the group consisting of (lower) alkyl, chloro, bromo, hydrogen and mixtures thereof, and n is at least 30. The term (lower) alkyl includes hydrocarbon groups of from 1-6 carbon atoms.

Special mention is made of polycarbonate resins of the formula:

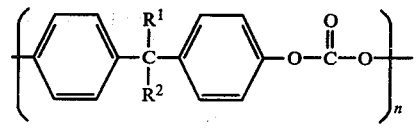

wherein $R^1$, $R^2$, and n are as above defined.

High molecular weight, thermoplastic aromatic polycarbonates in the sense of the present invention are to be understood as homopolycarbonates and copolycarbonates and mixtures thereof which have a number average molecular weight of about 8,000 to more than 200,000, preferably of about 10,000 to 80,000 and I.V. of about 0.30 to 1.0 dl/g as measured in methylene chloride at 25° C. The melt viscosity by ASTM Test Method D-1238 should be, as mentioned above, in the range of from about 2.8 to about 20.0 grams per 10 minutes, preferably between 14 and 20. These polycarbonates are derived from dihydric phenols such as, for example, 2,2-bis(4-hydroxyphenyl)propane, bis (4-hydroxyphenyl)methane, 2,2-bis(4-hydroxy-3-methylphenyl)propane, 4,4-bis(4-hydroxyphenyl)heptane, 2,2-(3,5,3'5'-tetrachloro-4-4'-dihydroxyphenyl)propane, 2,2-(3,4,3'5'-tetrabromo-4,4'-dihydroxydiphenyl)propane, and (3,3'-dichloro-4-4'-dihydroxydiphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436 or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or acid terminated polyester, or with a dibasic acid in the event a carbonate copolymer or interpolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

The amount of impact modifier (b) can vary over a broad range, from amounts as low as 0.1 part by weight up to about 30 parts by weight, but generally, the preferred range is from about 1.0 to about 12 parts by weight per 100 parts by weight of (a) and (b) together.

Preferred compositions will include (a) from about 60 to about 85 parts by weight of the thermoplastic polyolefin resin, and from about 10 to about 30 parts by weight of glass fibers, per 100 parts by weight of polyolefin resin and glass; and (b) from about 5 to about 30 parts by weight of said high molecular weight aromatic polycarbonate resin per 100 parts by weight of (a) and (b) combined.

The components can be compounded in any suitable way. For example, the three materials—polyolefin, glass and aromatic polycarbonate resin can be dry blended, then fluxed, e.g., on a mill or in an extruder, mixed and cooled then chopped into granules suitable for thermoforming, by conventional techniques.

DESCRIPTION OF THE PREFERRED EMBODIMENTS

The examples which follow illustrate the invention. All parts are by weight. The ingredients were weighed and the compositions were prepared by the conventional method of dry blending by mechanical mixing followed by extrusion at about 260° C. The extrudate was comminuted into pellets and the pellets were injection molded at 200° C. into specimens measuring about $2\frac{1}{2}''\times\frac{1}{2}''\times\frac{1}{8}''$ and $\times\frac{1}{4}''$. The term "Double Gate" (DG) is used to refer to the preparation of a molded sample in a mold having two entry ports so that a weld line results at the junction of the fluid resin in the mold during the molding cycle. The design, directions for molding, and for testing the examples are as called for by ASTM D-256. Izod impact strengths are reported as ft.lbs./in.-oz. notch. Double Gate values are reported in ft.-lbs.

The resistance to environmental stress crazing and craking of certain of the polycarbonate resin mixtures prepared in accordance with the invention was determined by subjecting stressed specimens to gasoline soaking and then measuring their impact strengths with special attention to their mode of failure, ductile failure being preferable. The specimens are ASTM D-256 impact test bars of two sizes: $2\frac{1}{2}''\times\frac{1}{2}''\times\frac{1}{8}''$ and $2\frac{1}{2}''\times\frac{1}{2}''\times\frac{1}{4}''$. Values of the desired stress were applied to each test bar by mounting on an ASTM stress jig (0.4 percent strain). The mounted bars were soaked 4 hours at room temperature in AMOCO ® unleaded premium gasoline. They were removed from the jig, the gasoline evaporated and the bars dried for 24 hours. Izod impact strengths were then determined according to ASTM D-256 procedures on notched specimens. In most cases, the properties are compared with those of identical unsoaked, molded mixtures. Those which retain a substantial amount of impact resistance after soaking are obviously the best at resisting environmental stress cracking.

EXAMPLES 1-5

Linear low density polyethylene resins comprising ethylene copolymerized with small amounts of butene-1 and octene-1, respectively, were mixed with $\frac{1}{8}$ inch chopped glass fibers and a 2,2-bis(4-hydroxyphenyl) propane carbonate.

The dry blend was extruded, the extrudate was chopped into molding pellets and the pellets were molded into test pieces in a 3 oz. injection molding machine. The compositions made and properties obtained on testing the molded articles are set forth in Table 1.

TABLE 1

| COMPOSITIONS COMPRISING LLDPE/ GLASS/POLYCARBONATE | | | | | | | |
|---|---|---|---|---|---|---|---|
| Example | A* | B* | 1 | 2 | 3 | 4 | 5 |
| Composition (parts by weight) | | | | | | | |
| Linear low density polyethlene[a] | 80 | — | 85 | 80 | 75 | 60 | — |
| Linear low density polyethylene[b] | — | 80 | — | — | — | — | 85 |
| Glass fiber reinforcement[c] | 20 | 20 | 10 | 10 | 20 | 30 | 10 |
| Aromatic polycarbonate[d] | — | — | 5 | 10 | 5 | 10 | 5 |
| Properties | | | | | | | |
| Before Gasoline Soaking | | | | | | | |
| Izod impact strength, ft. lbs./in. | | | | | | | |
| $\frac{1}{8}$ inch specimen | — | — | 2.6 | 2.2 | 2.1 | 1.4 | 2.1 |
| $\frac{1}{4}$ inch specimen | — | — | 2.0 | 1.8 | 1.7 | 1.1 | 1.8 |
| Double Gate weld line, ft. lbs. | 1.3° | 1.3° | 2.5[60] | 2.1 | 1.5[60] | 1.2[60] | 2.1[20] |
| After Gasoline Soaking | | | | | | | |
| Izod impact strength, ft. lbs./in. | | | | | | | |
| $\frac{1}{8}$ inch specimen | — | — | 2.5 | 2.1 | 2.1 | 1.4 | 2.1 |
| $\frac{1}{4}$ inch specimen | — | — | 2.0 | 1.8 | 1.7 | 1.1 | 1.8 |

The Examples according to this invention process well and retain a significant amount of their impact strength after soaking in gasoline. Ductility is significantly higher.
*Controls
[a]Exxon Co. copolymer of ethylene and butene-1, LPX-15.
[b]Dow Chemical Co. copolymer of ethylene and octene-1, DOWLEX 60500-0.38.
[c]Owens Corning Fiberglass Company P197B,$\frac{1}{8}''$ chopped strand.
[d]General Electric Company LEXAN ® 120.

EXAMPLES 6-7

The general procedure of Example 1 is repeated substituting a polypropylene resin for the linear low density polyethylene resins. The formulations used and the results obtained are set forth in Table 2.

TABLE 2

| COMPOSITIONS COMPRISING POLYPROPYLENE/ GLASS/AROMATIC POLYCARBONATE RESIN | | | |
|---|---|---|---|
| Example | C* | 6 | 7 |
| Composition (parts by weight) | | | |
| Polypropylene[a] | 80 | 80 | 70 |
| Glass fiber reinforcement[b] | 20 | 10 | 20 |
| Aromatic polycarbonate[c] | — | 10 | 10 |
| Properties | | | |
| Izod impact strength, ft. lbs/in. | | | |
| $\frac{1}{8}$ inch specimen | 1.0° | 1.4 | 1.4 |
| $\frac{1}{4}$ inch specimen | — | 1.4 | 1.4 |
| Double Gate strength, weld line, ft. lbs. | — | 1.4° | 1.4° |

*Controls
**Unless otherwise indicated, all failures in ductile mode.
[a]Hercules Company Profax PP SB-8623
[b]See Table 1
[c]General Electric Company LEXAN ® 120

Polypropylene with glass fiber is seen to be embrittled. This disadvantage is overcome with a small amount of polycarbonate.

The above-mentioned patents and publications are incorporated herein by reference. Other variations are possible in light of the above teachings. For example, high density and low density polyethylene can be used as the polyolefin, as well as ethylene-ethyl acrylate copolymers. Chopped glass mat can be used as the reinforcement. For the 2,2-bis(4-hydroxy-phenyl) carbonate there can be substituted dixylenol sulfone polycarbonate, or a polycarbonate derived from tetramethyl bisphenol-A. It is therefore to be understood that changes may be made in the particular embodiments of the invention described which are within the full intended scope of the invention as defined by the appended claims.

I claim:

1. A composition comprising in admixture
   (a) a thermoplastic polyolefin resin having incorporated therein from about 5 to 30 parts by weight of glass fibers per 100 parts by weight total of said resin and said glass; and
   (b) a high molecular weight aromatic polycarbonate resin derived from 2,2-bis(4-hydroxyphenyl)propane in sufficient quantities to impact modify (a) and being present in from about 5 to about 30 parts by weight per 100 parts by weight of (a) and (b) together.

2. A resin composition as defined in claim 1 wherein the thermoplastic polyolefin resin is a polyethylene, a poly alpha-olefin of from about 3 to about 8 carbon atoms, or a copolymer of ethylene with at least one of a member selected from an alpha-olefin of from about 3 to about 8 carbon atoms, a methacrylate ester of from about 4 to about 9 carbon atoms, an acrylic ester of from about 3 to about 8 carbon atoms, methacrylic acid or acrylic acid.

3. A resin composition as defined in claim 2 wherein said thermoplastic polyolefin resin is a polyethylene resin.

4. A resin composition as defined in claim 2 wherein said thermoplastic polyolefin resin is a linear low density polyolefin resin.

5. A resin composition as defined in claim 2 wherein said thermoplastic polyolefin resin is a polypropylene resin.

6. A resin composition as defined in claim 1 wherein the glass fibers are present in an amount of from 10 to about 30 parts by weight per 100 parts by weight of component (a).

* * * * *